Oct. 11, 1966 M. G. BIENHOFF 3,278,917

DATA STORAGE SYSTEM AND ADDRESSING CIRCUIT

Filed May 10, 1962

MILTON G. BIENHOFF
INVENTOR.

BY Samuel Lindenberg

ATTORNEY

United States Patent Office 3,278,917

Patented Oct. 11, 1966

3,278,917
DATA STORAGE SYSTEM AND ADDRESSING CIRCUIT

Milton G. Bienhoff, Canoga Park, Calif., assignor, by mesne assignments, to The Bunker-Ramo Corporation, Stamford, Conn., a corporation of Delaware
Filed May 10, 1962, Ser. No. 193,802
4 Claims. (Cl. 340—174)

This invention relates to systems for entering data into magnetic-core storage systems and, more particularly, to improvements therein.

The high-speed memories which are employed in present-day computers usually are magnetic-core memories. A magnetic-core memory usually consists of a large number of magnetic ferrite cores, each of which is capable of manifesting by its state of magnetic remanence whether it is storing a binary one or a binary zero. The size of a memory is determined for any given computer by not only the computer design specifications, but also by economic considerations and electrical considerations. By economic considerations is simply meant that magnetic-core memories are expensive to build and the larger the magnetic-core memory required, the more expensive the cost not only of the memory itself, but also of the peripheral gear required to operate the memory and of the power required for driving the memory. By electrical considerations is meant that, as the memory size grows larger, problems such as inductive pickup, impedance-matching consideration, and noise pickup are introduced and serve to put practical limits upon the size of the memory.

A high-speed memory in a computer will not only store data which is being processed by the computer, but is used to store program information or instructions which are read out of the memory for the purpose of instructing the computer in its operation. The use of the memory for storing instructions which are read out at the proper time for operating the computer is best exemplified in computers of the type known as stored-logic computers. In a stored-logic computer, there is usually a minimum of fixed, or wired-in sequencing. The various structures of the computer operate in response to a sequence of elementary commands which are read out from the memory. The advantage of the stored-logic computer over the other types is that it has a very high degree of flexibility. It can omit a great deal of the hardware found in other computers, and thus can be built more cheaply than computers having fixed instruction repertoires. However, a portion of its storage must be given over to storing the command sequences which make up an instruction.

A programmer for either the stored-logic type of computers or the other, more conventional, types, when faced with the problem of not enough storage space usually programs the computer so that some of the required information is stored in auxiliary memory facilities, such as punched paper tape or magnetic tape. At some time during the sequence of operation of the computer, the data-processing operation is halted while an exchange of data and/or instructions occurs between the memory in the computer and the auxiliary memory apparatus. The instructions in the computer may be replaced by a new set of instructions. Then the computer is allowed to process data again under control of a new set of instructions.

As pointed out above, it is not economically feasible to build the memory of a computer large enough to handle any and all demands which may be made upon it. It appears cheaper to program the computer to use the storage capabilities of punched paper tape or magnetic tape. However, this slows down the operation of the computer and does result in an expenditure of time and money on the part of the programmer, who must program these operations.

An object of this invention is to provide an improved arrangement for a magnetic-core memory in a computer, whereby it is made capable of storing more data without increasing its physical size.

Yet another object of the present invention is the provision of an improved arrangement for a magnetic-core memory system in a computer whereby the time required for entering instructions into the memory is considerably reduced.

Still another object of the present invention is the provision of a simple addition to a high-speed magnetic-core memory in a computer, whereby the time required for storing data in said memory is reduced.

Yet another object of this invention is the provision of an improved memory arrangement for a computer.

These and other objects of the present invention may be achieved in a magnetic-core memory by threading certain cores in that memory with a winding. A current source may be connected to that winding at the proper time to apply current thereto. As a result, the certain cores in the memory to which the winding is connected will be driven to one or the other of their states of magnetic remanence as determined by the sense of the coupling of the winding on the cores.

As a result, instructions are stored in the core memory in binary form. If the data in the portion of the memory to which the winding is connected is erased prior to excitation of the winding, then the winding need only be connected to those cores which must be driven to the "one" state to represent the desired information. Otherwise, the winding should be connected to every core in the memory in which it is desired to store a binary digit. The sense of the connection of the winding on a core will be determined in accordance with whether it is desired to drive a particular core to one or the other of its two states of magnetic remanence.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
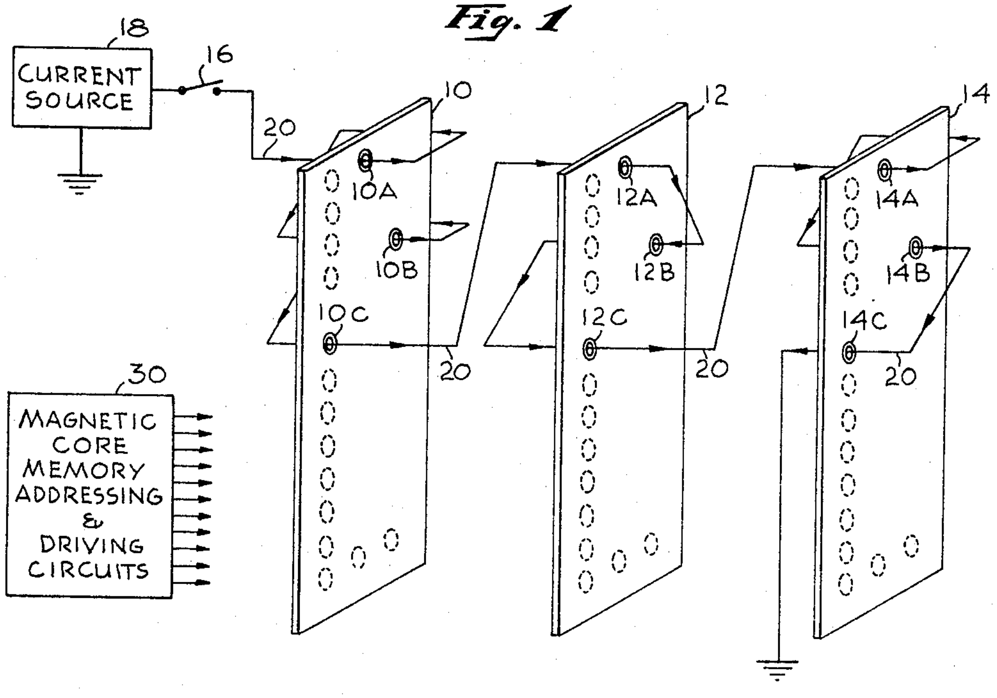
FIGURE 1 is a block diagram of an embodiment of the invention.

A computer will have one or more different programs, each of which is made up of a number of different instructions for ordering the computer. As an example, in order to enter data from an external device, such as magnetic tape or punched tape, into the memory, the computer may be required to stop other computing activity, set up the input apparatus for receiving the incoming data, issue instructions to the input apparatus to commence entering the data, hold the data if received in segments such as word pieces until a complete word is assembled, and then enter the data into a prescribed section of the memory, and thereafter return control to the internal control apparatus to the computer. This latter may consist of commencing to process the received data.

Heretofore, in building a computer, the designer had a number of choices. He could design the computer so that the routine of the type mentioned was effectively wired into the computer. He could allocate memory space wherein instructions for ordering the routine are permanently stored. The wired-in arrangement is expensive and wasteful of apparatus, since it is not used except for the specified routine. For the same reason, the latter is wasteful of memory space, which could be well used by the computer for computing functions or storage of more actively used computer instructions.

A magnetic-core memory, as is well known, consists of a plurality of magnetic cores, each of which is capable of storing a binary bit of information. In the ordinary use of a magnetic-core memory, data is stored a word at a time; that is, the magnetic-core memory is divided into a large number of magnetic-core planes. Each core plane effectively consists of a large number of magnetic cores, which are arrayed in rows and columns. Data is entered by driving a single core which is similarly positioned within each core plane to its P or N state of magnetic remanence, respectively representing a one or a zero, in accordance with the appropriate bit, e.g. stored in a data register, sought to be entered into the memory.

There are different known magnetic-core memory organizations for selecting and driving the desired core in each core plane, either for the purpose of entry of data or for the purpose of reading data out from the memory. These various memory arrangements are well known and thoroughly described in the literature. Accordingly, they will not be described again herein. Basically, however, the writing function is accomplished in a core memory by applying to a selected core a sufficient number of partial drives to provide a total sum which is sufficient to drive a core to the desired state of magnetic remanence, or by applying a drive to a number of cores sufficient to drive them all to one of their states of magnetic remanence. Those of the cores which are being driven and which must remain in the other of their states of magnetic remanence receive an inhibiting drive e.g. controlled by a corresponding data register bit, so that they remain relatively unaffected.

In accordance with this invention, it is possible to enter into a desired section of a magnetic-core memory as many instructon words as are desired, when it is desired to do this, without resorting to the usual mechanism for addressing and writing into the core memory. Reference is now made to FIGURE 1, which shows a circuit diagram of an embodiment of this invention. Since a magnetic-core memory is a well-known and complex electronic arrangement, only sufficient portions thereof will be shown to enable one to understand this invention and the operation thereof and to be able to construct this invention. Thus, although a magnetic-core memory consists of a large number of magnetic-core planes, only three core planes, respectively 10, 12, 14, are shown in FIGURE 1. Further, although each magnetic-core plane will consist of several hundred magnetic cores arranged in rows and columns, each one of the magnetic-core planes shown has only three cores, respectively 10A, 10B, 10C, 12A, 12B, 12C, and 14A, 14B, 14C.

In accordance with this invention, whenever it becomes necessary to perform a certain routine from instructions from the memory, a switch 16 is closed. This enables current from a current source 18 to flow through an auxiliary write winding 20. This winding is inductively coupled to magnetic cores in each core plane which are to be used for storage. The sense of the coupling of the winding to a magnetic core determines whether that core will be driven to its P or N state of magnetic remanence. Thus, the winding 20 is inductively coupled to the cores 10A, 10B, and 10C in the first core plane 10 to drive these cores to their P state of magnetic remanence. The winding 20 is next inductively coupled to the cores in core plane 12 such as core 12A to drive it to its P state, to the core 12B to drive it to the N state, and to the core 12C to drive it to its P state of magnetic remanence. The winding 20 is next inductively coupled to the cores in core plane 14 such as cores 14A and 14B to drive them to their P state of magnetic remanence and to the core 14C to drive it to its N state of magnetic remanence.

As exemplified in FIGURE 1, by closing switch 16, three words of instruction are simultaneously entered into the desired wired-in location in the magnetic-core memory without the necessity of employing the magnetic-core memory addressing and driving circuits 30.

All the words of a routine may be entered into the memory simultaneously, or, where for technical reasons this may not be feasible, they may be entered in sequence, several words at a time, by breaking the single serial drive winding 20 into a plurality of drive windings, each of which is used to enter the permitted number of instructions; which additional windings are driven in sequence.

Effectively, in accordance with this invention, words are stored in wires which are energized to enter the data into the memory, when required. These wires can be threaded through the core memory very simply and inexpensively at the time that the core memory is being constructed. The switch 16 may be on the panel of the computer, to be manually excited whenever the program or data which the wired storage facility specifies is required. The cores to which the wire 20 is coupled are available for other storage purposes as soon as the instructions which they hold have been carried out. The switch 16 may be actuated from within the computer by a relay or other electronic equivalent whenever specified by the computer.

Figure 2:
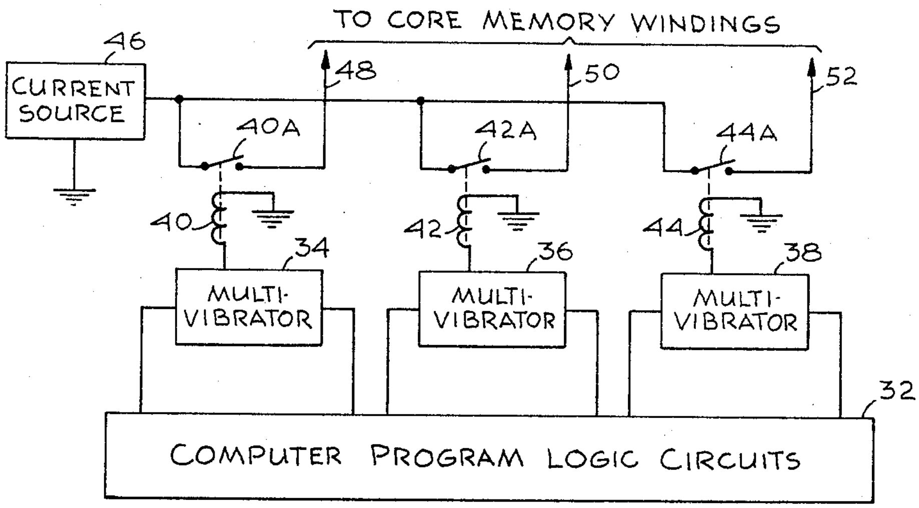
FIGURE 2 is a block diagram of another arrangement for an embodiment of the invention.

FIGURE 2 shows an arrangement which can be employed for substantially simultaneously writing into the memory different sets of instructions. These instructions are stored in separate wires permanently wired into the memory in the manner illustrated by the winding 20. The sequencing of a computer is under the control of its program logic. The program logic of the computer may have instructions entered therein, so that, when required, the computer program-logic circuits 32 will energize one or more of the one-shot multivibrators, respectively 34, 36, 38. Multivibrator 34, when energized, in turn energizes a relay 40, which closes the contacts 40A. Thereby, current is enabled to flow from a current source 46 to the permanently connected winding 48 in the core memory.

The one-shot multivibrator 36, when energized, in turn energizes a relay 42 to cause the contacts 42A to be momentarily closed. This enables current to flow from the current source 46 to another winding 50 which is inductively coupled to preselected cores in the memory, to drive them to either their P or N states, thereby storing instructions for the computer. Multivibrator 38, when energized, in turn energizes a relay 44 to cause closure of the relay contacts 44A. This, in turn, causes current to flow from the current source 46 to a memory winding 52 of the type exemplified by the windings 20. This effectuates storage of a plurality of instructions for carrying out a different routine than those stored by energization of either multivibrator 34 or 36.

It should be appreciated that by the simultaneous entry into a computer core memory of a plurality of instruction words, a great deal of time is saved over sequentially entering these words from an external source, the usual procedure in these cases. The size of the core memory is effectively enlarged by the adjunct of the wires storing the instructions. This technique may be extended so that not only several instruction, or data, words may be stored in the memory by merely closing a switch, but it may also be possible to store data tables, to which reference is had in the course of the operation of the computer.

There has accordingly been shown and described herein a novel, useful, and simple circuit arrangement for adding to the storage capabilities of a magnetic-core memory without increasing the cost thereof, or the size thereof, by the simple expedient of threading additional windings through those of the cores in the memory in which it is desired to store words or data which are used from time to time. The sense of the coupling of the winding on the cores determines the intelligence which is to be entered. Means are provided for applying current to these windings, so that they may be simultaneously excited for driving the cores to which they are coupled to the desired states of magnetic remanence. Although the embodiment of the invention has been described in connection with a magnetic-core memory, it will be appreciated that the invention may also have application in connection with other discrete storage-type of memories, where access to the storing elements of the memory may be had by a wire for the purpose of storage. This may be a magnetic-film type of memory or a ferroelectric type of memory.

I claim:

1. In a computer; a memory comprised of a plurality of discrete storage elements; addressing means for addressing said storage elements for the purpose of storing data therein and reading the data which has been stored therein; auxiliary write means independent of said addressing means for substantially simultaneously entering data into a predetermined portion of said memory, said auxiliary write means comprising first means coupled to preselected elements in said predetermined portion of said memory and second means for selectively exciting said first means for substantially simultaneously driving said preselected elements to a predetermined storage state.

2. In a computer; a memory comprised of a plurality of discrete storage elements; addressing means for addressing said storage elements for the purpose of storing data therein and reading data which has been stored therein; auxiliary write means independent of said addressing means for substantially simultaneously entering data into a predetermined portion of said memory, said auxiliary write means comprising a plurality of first means each coupled to a different set of preselected elements in said predetermined portion of said memory and second means for selectively exciting each of said first means for substantially simultaneously driving the set of preselected elements coupled thereto to a predetermined storage state.

3. The subject matter of claim 2 wherein each of said storage elements comprises a magnetic core and each of said first means comprises a winding.

4. In a computer;

a magnetic memory including a plurality of bit planes, each comprised of a rectangular matrix of discrete magnetic elements and defining multibit word locations, each comprised of a correspondingly positioned element in each of said plurality of planes;

means for writing data from a register into one of said locations by driving the magnetic elements thereof to assume one or the other of two states of magnetic remanence;

means for reading data from one of said word locations into said register by driving the magnetic elements thereof to a selected one of said states;

an auxiliary write winding fixedly coupled to predetermined ones of said magnetic elements of at least one of said word locations;

a source of excitation current; and means for connecting said source of excitation current to said auxiliary write winding for substantially simultaneously driving said predetermined ones of said magnetic elements to a state determined by the sense with which said winding is coupled thereto.

References Cited by the Examiner

UNITED STATES PATENTS

| | | | |
|---|---|---|---|
| 2,844,812 | 7/1958 | Auerback | 340—174 |
| 2,912,677 | 11/1959 | Ashenhurst et al. | 340—174 |
| 3,027,548 | 3/1962 | Vaughan | 340—174 |
| 3,061,821 | 10/1962 | Gribble et al. | 340—174 |
| 3,063,037 | 11/1962 | Jacks | 340—173 |

BERNARD KONICK, *Primary Examiner.*

IRVING SRAGOW, *Examiner.*

H. D. VOLK, M. K. KIRK, J. MOFFITT, *Assistant Examiners.*